United States Patent [19]

Watanabe et al.

[11] Patent Number: 4,731,198

[45] Date of Patent: Mar. 15, 1988

[54] POSITIVELY CHARGED ANTIMONY PENTOXIDE SOL AND PREPARATION THEREOF

[75] Inventors: Yoshitane Watanabe, Tokyo; Masayuki Teranishi; Keitaro Suzuki, both of Funabashi, all of Japan

[73] Assignee: Nissan Chemical Industries, Ltd., Tokyo, Japan

[21] Appl. No.: 846,580

[22] Filed: Mar. 31, 1986

[30] Foreign Application Priority Data

Apr. 3, 1985 [JP] Japan .................. 60-70720

[51] Int. Cl.$^4$ .............................. B01J 13/00
[52] U.S. Cl. .................. 252/313.1
[58] Field of Search ................. 252/313.1

[56] References Cited

U.S. PATENT DOCUMENTS

| | | | |
|---|---|---|---|
| 3,676,186 | 7/1972 | Pytlewski | 252/313.1 |
| 3,860,523 | 1/1975 | Petrow et al. | 252/313.1 |
| 4,110,247 | 8/1978 | Gower et al. | 252/313.1 |
| 4,341,655 | 7/1982 | Richardson | 252/313.1 |
| 4,589,997 | 5/1986 | Watanabe et al. | 252/313.1 |
| 4,608,198 | 8/1986 | Watanabe et al. | 252/313.1 |

*Primary Examiner*—Edward A. Miller
*Attorney, Agent, or Firm*—Frishauf, Holtz, Goodman & Woodward

[57] ABSTRACT

Disclosed is a positively charged antimony pentoxide sol, comprising colloidal particles of antimony pentoxide sol coated on their surfaces with at least one of trivalent and tetravalent metals, the content of the metals being 1 to 50% by weight in terms of the metal oxide based on antimony pentoxide in the antimony pentoxide sol.

When the positively charged antimony pentoxide sol of this invention is mixed with a cationic resin emulsion or an aqueous solution of a cationic water-soluble polymer, no agglomeration occurs and also, when it is added into an aqueous solution of an inorganic acid such as hydrochloric acid, sulfuric acid, nitric acid, etc., or an organic acid such as acetic acid, propionic acid, oxalic acid, maleic acid, etc., an aqueous solution of a metal salt or amine salts of these acids or an organic solvent such as an alcohol, no agglomeration occurs but it is well dispersed therein, and therefore it can be applicable for fields in which the antimony pentoxide sol of the prior art cannot satisfactorily be used.

14 Claims, No Drawings

4,731,198

POSITIVELY CHARGED ANTIMONY PENTOXIDE SOL AND PREPARATION THEREOF

BACKGROUND OF THE INVENTION

This invention relates to a positively charged antimony pentoxide sol obtained by mixing an antimony pentoxide sol with an aqueous solution of a basic salt of trivalent and/or tetravalent metal and also to a process for producing the same.

Antimony pentoxide sols which have been known in the art are negatively charged on the surface of their particles. As the processes for producing such sols, there have been known the method in which an alkali antimonate is deionized with an ion-exchange resin (U.S. Pat. Nos. 3,860,523 and 4,110,247); the method in which antimony trioxide is oxidized with hydrogen peroxide under a high temperature (U.S. Pat. No. 4,022,710, Japanese Unexamined Patent Publication No. 21298/1977, U.S. Pat. No. 4,026,819); the method in which an alkyl antimonate is allowed to react with an inorganic acid, followed by peptization (Japanese Unexamined Patent Publication No. 41536/1985).

The above antimony pentoxide sols of the prior art have been utilized for various uses by making use of their microparticulate characteristics. For example, they can be used as flame retardant treating agents or flame retardant adhesives for fabrics by mixing with various resin emulsions. In order for the mixture of the sol and a resin emulsion to exhibit satisfactory flame retardant effect, the particles of the antimony pentoxide sol are required to be dispersed in the state approximate to primary particles without agglomeration as far as possible. Since the surface of the particles of the antimony pentoxide sol of the prior art is negatively charged, it can be mixed with an anionic resin emulsion comprising particles with the same negative surface charges without causing agglomeration due to repellency of charges between the particles. Whereas, when a cationic resin emulsion comprising particles with positive surface charges is mixed with an antimony pentoxide sol, agglomeration will instantly occur due to the mutually opposite polarity in charges, whereby no such mixture can be practically used.

On the other hand, an aqueous solution of a water-soluble polymer has properties such as dispersing, thickening, bonding, blocking properties, and therefore used for surface treatment of plastics, and the like. The water-soluble polymer includes polyvinyl alcohol, polyacrylamide, polyalkylene oxide and anionic or cationic polyelectrolytes such as polymers having carboxy groups, amino groups in side chains or main chains. However, the antimony pentoxide sol involve the drawback that it cannot be provided for practical use, because agglomeration occurs when it is mixed with a cationic water-soluble polymer.

Further, for example, the antimony pentoxide sol finds its use in a flame retardant acrylic fiber. By introducing antimony pentoxide colloidal particles into an acrylic fiber, there can be obtained a flame retardant fiber having high transparency and excellent dyeability, and for this purpose antimony pentoxide sol must be dispersed without agglomeration in a spinning solution of an acrylic fiber. Whereas, the antimony pentoxide sol of the prior art is liable to be agglomerated in an inorganic acid such as sulfuric acid, nitric acid, etc., and a conc. aqueous solution of an inorganic salt such as zinc chloride, sodium rhodanide, which is a good solvent for an acrylic polymer, whereby there are involved the drawbacks such that clogging of nozzle or fiber breaking may occur during spinning or that transparency of the fiber obtained is markedly lowered. For this reason, in practical application, it is required to perform a special operation such as vigorous stirring during mixing (Japanese Unexamined Patent Publication No. 142715/1980).

Further, for example, in the case of adding antimony pentoxide sol as the microfiller for the purpose of flame retardancy and increase of surface hardness into an alcoholic solution and water-alcoholic solution of a silicone resin to be used as the surface treating agent for plastic moldings or plastic films, the antimony pentoxide sol of the prior art is susceptible to agglomeration, thereby having the drawback of being lowered in transparency.

SUMMARY OF THE INVENTION

An object of the present invention is to provide an antimony pentoxide sol which can be well dispersed in a cationic resin emulsion, a cationic water-soluble polymer solution, inorganic and organic acid, aqueous solutions containing the metal salts or organic amine salts of these acids, and organic solvents such as alcohols, in which antimony pentoxide sols of the prior art could be dispersed with difficulty as described above.

The present inventors have studied intensively on modification of the antimony pentoxide sol suited for the above object and consequently found that the desired antimony pentoxide sol can be obtained by coating the surfaces of the particles of antimony pentoxide sol with at least one of trivalent and tetravalent metals.

More specifically, the present invention concerns a positively charged antimony pentoxide sol, comprising colloidal particles of antimony pentoxide coated on their surfaces with at least one of trivalent and tetravalent metals, the content of said metal being 1 to 50% by weight as the metal oxide based on antimony pentoxide ($Sb_2O_5$) and a process for producing the same.

DESCRIPTION OF THE PREFERRED EMBODIMENTS

In this invention, the expression "surfaces of the antimony pentoxide colloidal particles are coated with the above metal" means that said metal is fixed onto the surfaces of the antimony pentoxide colloidal particles in the form of polycations of said metal or microcolloide of said metal oxides or hydroxides. The concentration of antimony pentoxide ($Sb_2O_5$) in the antimony pentoxide sol positively charged is within the range of from 1 to 60% by weight, while the content of the trivalent and/or tetravalent metal is 1 to 50% by weight as metal oxides based on $Sb_2O_5$. The average particle size of the colloid coated with said metal should preferably be 5 to 150 mμ. The pH value of said sol should preferably be 7 or less.

The process for producing the positively charged antimony pentoxide sol of the present invention comprises mixing an antimony pentoxide sol of pH 1 to 10 containing 5 to 60% by weight of $Sb_2O_5$ and an aqueous solution of at least one of basic salts of trivalent and tetravalent metals at proportions such that the amount of said basic salt may be 1 to 50% by weight as the metal oxide based on $Sb_2O_5$.

The antimony pentoxide sol to be used in the present invention may include antimony pentoxide sols obtained by various preparation methods known in the art as mentioned above. Of these sols, sols with any pH may be available, such as the acidic sol of pH 1 to 4 obtained by the ion-exchange method or the oxidation method, a sol of pH 4 to 10 obtained by addition of an organic amine or an alkali metal to an acidic sol or a sol of pH 4 to 10 containing an organic amine obtained by the peptization method.

The water-soluble basic salt to be used in the present invention is that of a trivalent or tetravalent metal, including as the trivalent metal aluminium, chromium, gallium, indium, tantalum, etc., and, as the tetravalent metal, zirconium, tin, titanium, germanium, cerium, hafnium, thorium, etc. Preferably, aluminium and zirconium are used. As anions, chloride ions, nitrate ions, sulfate ions, acetate ions, formate ions, etc., may be used, and chloride ions and acetate ions are preferred. Although a basic salt with any composition may be used, it is preferable to use a basic salt with little acid content. Examples of such basic salts include basic aluminium chloride such as $Al_2(OH)_5Cl$ and $Al(OH)_2Cl$, basic aluminium acetate such as $Al(OH)_2(CH_3COO)\cdot2\frac{1}{3}H_3BO_3$, basic aluminium nitrate such as $Al(OH)(NO_3)_2$, basic aluminium formate such as $Al(OH)(HCOO)_2$, basic zirconium chloride such as $Zr(OH)_2Cl_2$, basic zirconium acetate such as $Zr(OH)_2(CH_3COO)_2$, basic zirconium nitrate such as $Zr(OH)_2(NO_3)_2$, basic titanium chloride such as $Ti(OH)Cl_3$, basic titanium acetate such as $Ti(OH)(CH_3CO_2)_3$, and the like. These compounds are available as powder or aqueous solutions and are commercially available.

The particles of antimony pentoxide sols are not only negatively charged on the surfaces but also have strong ion-exchange capacity. Accordingly, when antimony pentoxide sol is mixed with an aqueous solution of a basic salt, the surfaces of the colloidal particles of antimony pentoxide sol are coated with the polycations (metal ions) in the basic salt by fixing them not only through physical adsorption but also by chemical adsorption. For this reason, a very stable colloid solution is formed without heating or pressurization. At the moment of mixing of them, formation of primarily minute gels will frequently occur and therefore it is preferable to perform strong stirring by means of a high speed impeller mixer or a homogenizer. Also, by employment of the method in which antimony pentoxide sol is added into an aqueous solution of a basic salt, formation of minute gels will be reduced, whereby the stirring time for obtaining a homogeneous colloidal solution can be shortened. The amount of the basic salt added is preferably 1 to 50% by weight, preferably 3 to 20% by weight in terms of the oxide of the metal constituting the basic salt ($M_2O_3$ or $MO_2$) based on $Sb_2O_5$ in the antimony pentoxide sol. The necessary amount of the basic salt added depends on the specific surface area of the antimony pentoxide sol particles. An amount lower than 1% is insufficient for charging the surface of all the particles to positive, while the effect is the same even by addition of 50% or higher but it becomes inconvenient to use such a sol due to the increment of amount of co-existing anions.

By mixing an acidic sol of pH 1 to 4 with an aqueous solution of a basic salt, a sol positively charged of pH 0 to 3 can be obtained. This sol is stable as such, and stability of the sol will not be lowered even when the pH is adjusted to 2 to 5 by addition of a basic substance such as an alkali metal hydroxide or an organic amine. By concentration of the sol according to the evaporation method or the ultrafiltration method, a sol with a concetration of $Sb_2O_5$ of 30 to 60% by weight can be easily obtained. Also, when a sol of pH 4 to 10 stabilized with an alkali metal or an organic amine is mixed with a basic salt, a sol positively charged of pH 0 to 7 can be obtained. This sol is stable as such, but its stability can be further improved by controlling the pH by addition of an acidic substance such as nitric acid, hydrochloric acid, etc. Also, according to similar concentration, a highly concentrated sol can be easily obtained.

When the positively charged antimony pentoxide sol of this invention is mixed with a cationic resin emulsion or an aqueous solution of a cationic water-soluble polymer, no agglomeration occurs and also, when it is added into an aqueous solution of an inorganic acid such as hydrochloric acid, sulfuric acid, nitric acid, etc., or an organic acid such as acetic acid, propionic acid, oxalic acid, maleic acid, etc., an aqueous solution of a metal salt or amine salts of these acids or an organic solvent such as an alcohol, no agglomeration occurs but it is well dispersed therein, and therefore it can be applicable for fields in which the antimony pentoxide sol of the prior art cannot satisfactorily be used.

The present invention is described in more detail by referring to the following examples. However, the present invention is not limited to these examples. Also, unless otherwise specifically noted, all "%" are based on weight.

EXAMPLE 1

To 500 g of an antimony pentoxide sol containing no amine ($Sb_2O_5$ 10.9%, $Na_2O$ 0.79%, pH 2.2) prepared by the peptization method disclosed in Japanese Unexamined Patent Publication No. 41536/1985, 13.6 g of an aqueous aluminium chloride solution (Takibine: trade name, produced by Taki Kagaku; $Al_2O_3$ 23.0%, Cl 18.0%, pH 3.4) was added under stirring by means of a high speed impeller mixer and the mixture was stirred for 3 hours. The resultant milky white colloidal solution was found to contain 10.6% of $Sb_2O_5$ and 0.53% of $Al_2O_3$ (corresponding to 5% of $Sb_2O_5$) and had a pH of 1.9. The colloidal solution had a viscosity of 2.2 cp and was stable at 40° C. for one month. After 2.7 g of 28% ammonia water was added to the sol to adjust the pH to 4.6, the sol was concentrated by a rotary evaporator to $Sb_2O_5$ of 39.2%. The resultant sol had a pH of 4.2 and a viscosity of 8.3 cp, and it was also stable at 40° C. for one month.

EXAMPLE 2

To 500 g of the antimony pentoxide sol ($Sb_2O_5$ 29.9%, $Na_2O$ 2.1%, pH 2.2) obtained by concentrating the sol used in Example 1 by the evaporation method, 7.35 g of an aqueous basic zirconium acetate (Zirconyl Acetate S-20: trade name, produced by Shinnippon Kinzoku Kagaku K.K.; $ZrO_2$ 20.3%, $CH_3COOH$ 14.7%, pH 3.1) was added under stirring by means of a high speed impeller mixer and the mixture was stirred for 3 hours. The resultant milky white colloidal solution was found to contain 26.6% of $Sb_2O_5$ and 1.33% of $ZrO_2$ (corresponding to 5% of $Sb_2O_5$), and had a pH of 2.4 and a viscosity of 2.8 cp. The sol was also stable at 40° C. for one month.

EXAMPLE 3

1500 g of the higyly concentrated antimony pentoxide sol ($Sb_2O_5$ 41.2%, $Na_2O$ 3.0%, $K_2O$ 3.2%, pH 6.3) obtained by adding potassium hydroxide to the sol used in Example 1, followed by concentration by the ultrafiltration method, was added into a mixture of 202 g of the same aqueous basic aluminium chloride solution and 358 g of water stirred by means of a high speed impeller mixer, and the mixture was mixed under stirring for 3 hours. The resultant milky white colloidal solution was found to contain 30.0% of $Sb_2O_5$ and 2.25% of $Al_2O_3$ (corresponding to 7.5% of $Sb_2O_5$), and had a pH of 5.2 and a viscosity of 4.4 cp. The sol was also stable at 40° C. for one month.

EXAMPLE 4

800 g of the highly concentrated sol added with potassium hydroxide used in Example 3 was added into a mixture of 165 g of the aqueous basic zirconium acetate solution used in Example 2 and 115 g of water stirred by means of a high speed impeller mixer, and the mixture was mixed under stirring for 2 hours. The resultant milky white colloidal solution was found to contain 30.5% of $Sb_2O_5$ and 2.25% of $ZrO_2$ (corresponding to 7.5% of $Sb_2O_5$), and had a pH of 4.6 and a viscosity of 15.9 cp. During storage at 40° C. for one month, the sol was found to be stable, although exibiting thixotropic property.

EXAMPLE 5

500 g of the highly concentrated sol added with potassium hydroxide used in Example 3 was added to a solution of 42 g of basic aluminium acetate powder (NIAPROOF: trade name, produced by NIACET Co.; $Al_2O_3$ 36.8%, $CH_3CO_2H$ 46.3%) dissolved in 133 g of water, and the mixture was mixed under stirring by means of a high speed impeller mixer for 3 hours. The resultant milky white colloidal solution was found to contain 30.5% of $Sb_2O_5$ and 2.29% of $Al_2O_3$ (corresponding to 7.5% of $Sb_2O_5$), and had pH of 5.8 and a viscosity of 21.1 cp. The sol was also found to be stable at 40° C. for one month.

EXAMPLE 6

300 g of a highly concentrated antimony pentoxide sol ($Sb_2O_5$ 51.3%, $Na_2O$ 3.8%, triethanolamine 2.4%, pH 6.2) prepared by the peptization method was added to 86 g of an aqueous basic zirconium acetate solution (the same as in Example 2) while stirring by means of a high speed impeller mixer, and the mixture was stirred for 3 hours. The resultant milky white colloidal solution was found to contain 40.4% of $Sb_2O_5$ and 4.52% of $ZrO_2$ (corresponding to 11% of $Sb_2O_5$), and had a pH of 4.2 and a viscosity of 200 cp. The sol was stable during storage at 40° C. for one month, but it exibited strong thixotropic property. When 7.7 g of a reagent of 60% nitric acid was added to the sol and mixed under stirring, the pH became 1.4 and the viscosity 17.1 cp. When this was stored at 40° C. for one month, no thixotropic property was exibited. Thus, improvement could be obserbed with respect to stability.

EXAMPLE 7

300 g of a highly concentrated antimony pentoxide sol ($Sb_2O_5$ 48.0%, $Na_2O$ 2.8%, triethanolamine 1.1%, pH 5.8) prepared by the ion-exchange method and stabilized with triethanolamine was added into a mixture of 73 g of the aqueous basic zirconium acetate solution (the same as in Example 2) and 113 g of water stirred by a high speed impeller mixer, and the mixture was further stirred for 1 hour. The resultant milky white colloidal solution was found to contain 30.0% of $Sb_2O_5$ and 3.05% of $ZrO_2$ (corresponding to 10% of $Sb_2O_5$), and had a pH of 4.2 and a viscosity of 29.6 cp. The sol was also found to be stable during storage at 40° C. or one month, although exhibiting thixotropic property.

EXAMPLE 8

1800 g of the highly concentrated antimony pentoxide sol prepared by the peptization method (the same as in Example 6) was added to a mixture of 231 g of the aqueous basic zirconium acetate solution (the same as in Example 2) and an aqueous solution of 126 g of the basic aluminium acetate powder (the same as in Example 5) dissolved in 873 g of water under stirring by means of a high speed impeller mixer, followed further by mixing for 3 hours. The resultant milky white colloidal solution was found to contain 30.5% of $Sb_2O_5$, 1.5% of $ZrO_2$ (corresponding to 5% of $Sb_2O_5$) and 1.5% of $Al_2O_3$ (corresponding to 5% of $Sb_2O_5$), and had a pH of 4.9 and a viscosity of 6.9 cp. The sol was also stable during storage at 40° C. for one month.

EXAMPLE 9

300 g of the highly concentrated antimony pentoxide sol prepared by the peptization method (the same as in Example 6) was added to a mixture of 77 g of an aqueous solution of a reagent of basic zirconium chloride containing 20% of $ZrO_2$ (pH 1 or less) and 136 g of water under stirring by means of a high speed impeller mixer, followed further by mixing for 1 hour. The resultant milky white colloidal solution was found to contain 30.0% of $Sb_2O_5$ and 3.0% of $ZrO_2$ (corresponding to 10% of $Sb_2O_5$), and had a pH of 0.7 and a viscosity of 3.9 cp. The sol was also found to be stable during storage at 40° C. for one month.

EXAMPLE 10

325 g of a highly concentrated antimony pentoxide sol ($Sb_2O_5$ 48.6%, triethanolamine 9.5%, pH 9.5) prepared by the peptization method was added into a mixed solution of 156 g of the basic zirconium acetate (the same as in Example 2) and 328 g of water under stirring by means of a high speed impeller mixer, followed further by mixing for 2 hours. The resultant milky white colloid solution was found to contain 19.5% of $Sb_2O_5$ and 3.9% of $ZrO_2$ (corresponding to 20% of $Sb_2O_5$), and had a pH of 5.2 and a viscosity of 10.0 cp.

EXAMPLE 11

To 500 g of an antimony pentoxide sol ($Sb_2O_5$ 22.1%, pH 1.36) obtained by the $H_2O_2$ oxidation method, 13.6 g of the aqueous basic aluminium chloride solution (the same as in Example 1) was added under stirring by means of a high speed impeller mixer, followed further by stirring for 2 hours. The resultant milky white colloidal solution was found to contain 21.5% of $Sb_2O_5$ and 0.61% of $Al_2O_3$ (corresponding to 2.8% of $Sb_2O_5$), and had a pH of 1.8 and a viscosity of 3.8 cp.

[Evaluation of Dispersibility of Antimony Pentoxide Sol]

Dispersibility of each sol from Example 1 to Example 11 in nitric acid and a cationic resin emulsion was examined. There was employed the method in which 50 g of nitric acid or a cationic resin emulsion (Neoprene latex 950 produced by Showa Neoprene K.K.) was sampled in 100 ml beaker, 50 g of the antimony pentoxide sol was added under stirring with the magnetic stirrer and the mixed state was observed. For the purpose of comparison, dispersibility was tested in the same manner for the antimony pentoxide sol used in Example 1 as Comparative Example 1, the highly concentrated antimony pentoxide sol stabilized with potassium hydroxide used in Example 3 as Comparative Example 2, and the highly concentrated antimony pentoxide sol stabilized with triethanolamine used in Example 7 as Comparative Example 3.

As the result, each of the antimony pentoxide sols positively charged obtained in Examples 1 to 11 was dispersed without agglomeration, but gelation occured for the antimony pentoxide sols of Comparative Examples 1 to 3.

We claim:

1. A positively charged antimony pentoxide sol, comprising colloidal particles of antimony pentoxide sol coated on their surfaces with at least one of trivalent and tetravalent metals, the content of said metals being 1 to 50% by weight in terms of the metal oxide based on antimony pentoxide in said antimony pentoxide sol.

2. The positively charged antimony pentoxide sol according to claim 1, wherein said antimony pentoxide is contained in an amount of 1 to 60% by weight.

3. The positively charged antimony pentoxide sol according to claim 1, wherein said colloidal particles have an average particle size of 5 to 150 m$\mu$.

4. The positively charged antimony pentoxide sol according to claim 1, wherein said positively charged antimony pentoxide sol has the pH value of 7 or less.

5. A process for preparing a positively charged antimony pentoxide sol, which comprises mixing an antimony pentoxide sol of pH 1 to 10 containing 5 to 60% by weight of antimony pentoxide and an aqueous solution of at least one of basic salts of trivalent and tetravalent metals at proportions such that the amount of said basic salt may be 1 to 50% by weight in terms of the metal oxide based on antimony pentoxide in said antimony pentoxide sol.

6. The process according to claim 5, wherein said trivalent and tetravalent metals are selected from the group consisting of aluminium, chromium, gallium, indium, tantalum, zirconium, tin, titanium, germanium, cerium, hafnium and thorium.

7. The process according to claim 6, wherein said basic salts of trivalent and tetravalent metals are selected from the group consisting of basic aluminium chloride, basic aluminium acetate, basic aluminium nitrate, basic aluminium formate, basic zirconium chloride, basic zirconium acetate, basic zirconium nitrate, basic titanium chloride and basic titanium acetate.

8. The positively charged antimony pentoxide sol of claim 1 wherein the content of said metals is 3 to 20% by weight.

9. The positively charged antimony pentoxide sol of claim 3 wherein the content of said metals is 3 to 20% by weight.

10. The positively charged antimony pentoxide sol of claim 9 wherein said sol has a pH value of 7 or less.

11. The positively charged antimony pentoxide sol of claim 10 wherein said trivalent and tetravalent metals are selected from the group consisting of aluminum, chromium, gallium, indium, tantalum, zirconium, tin, titanium, germanium, cerium, hafnium and thorium.

12. The positively charged antimony pentoxide sol of claim 11 wherein said basic salts of trivalent and tetravalent metals are selected from the group consisting of basic aluminium chloride, basic aluminium acetate, basic aluminium nitrate, basic aluminium formate, basic zirocnium chloride, basic zirconium acetate, basic zirconium nitrate, basic titanium chloride and basic titanium acetate.

13. The positively charged antimony pentoxide sol of claim 1 wherein said trivalent and tetravalent metals are selected from the group consisting of aluminium, chromium, gallium, indium, tantalum, zirconium, tin, titanium, germanium, cerium, hafnium and thorium.

14. The positively charged antimony pentoxide sol of claim 13 wherein said basic salts of trivalent and tetravalent metals are selected from the group consisting of basic aluminium chloride, basic aluminium acetate, basic aluminium nitrate, basic aluminium formate, basic zirocnium chloride, basic zirconium acetate, basic zirconium nitrate, basic titanium chloride and basic titanium acetate.

* * * * *